United States Patent [19]
Ueda et al.

[11] Patent Number: 5,092,692
[45] Date of Patent: Mar. 3, 1992

[54] PRINT PRESSURE RETRIVAL FROM ASCENDING ORDER TABLE

[75] Inventors: Hiroyuki Ueda, Yokohama; Takashi Miyazaki, Chigasaki; Toshiaki Ozawa, Urayasu; Yasuaki Yamada, Matsudo, all of Japan

[73] Assignee: Canon Kabushiki Kaisha, Tokyo, Japan

[21] Appl. No.: 587,553

[22] Filed: Sep. 24, 1990

Related U.S. Application Data

[63] Continuation of Ser. No. 309,928, Feb. 13, 1989, abandoned, which is a continuation of Ser. No. 170,700, Mar. 14, 1988, abandoned, which is a continuation of Ser. No. 907,152, Sep. 15, 1986, abandoned, which is a continuation of Ser. No. 647,153, Sep. 4, 1984, abandoned.

[30] Foreign Application Priority Data

Sep. 12, 1983 [JP] Japan .................. 58-167815

[51] Int. Cl.$^5$ .................................................. B41J 9/48
[52] U.S. Cl. .............................. 400/157.3; 400/144.2; 101/93.03
[58] Field of Search ............... 400/144.2, 157.2, 157.3, 400/166; 101/93.03

[56] References Cited

U.S. PATENT DOCUMENTS

| 3,858,509 | 1/1975 | Grundherr | 101/93.19 |
| 3,903,510 | 9/1975 | Zobel | 364/900 |
| 3,931,615 | 1/1976 | Oliver | 364/900 |
| 4,118,129 | 10/1978 | Grundherr | 400/144.2 |
| 4,189,246 | 2/1980 | Kane et al. | 400/157.3 X |
| 4,195,339 | 3/1980 | Smith | 364/900 |
| 4,367,537 | 1/1983 | Yoshida | 364/900 |

FOREIGN PATENT DOCUMENTS

| 84881 | 5/1982 | Japan | 400/157.3 |
| 2087115 | 5/1982 | United Kingdom | 400/157.3 |

Primary Examiner—David A. Wiecking
Assistant Examiner—Steven S. Kelley
Attorney, Agent, or Firm—Fitzpatrick, Cella, Harper & Scinto

[57] ABSTRACT

A printer has a memory containing print information on a plurality of characters, grouped by a print pressure of the character, and a control unit for controlling the print pressure in accordance with the print information stored in the memory. The memory stores the print information for each print pressure group in ascending order. The duration of the impact pulse is determined once the character's code is found in the list of characters stored in order of lowest to highest impact energy, based on character size.

9 Claims, 9 Drawing Sheets

| FIG.3A |
|--------|
| FIG.3B |

FIG. 3A

| | | | b7 | 0 | 0 | 0 | 0 | 1 | 1 | 1 | 1 |
|---|---|---|---|---|---|---|---|---|---|---|---|
| | | | b6 | 0 | 0 | 1 | 1 | 0 | 0 | 1 | 1 |
| | | | b5 | 0 | 1 | 0 | 1 | 0 | 1 | 0 | 1 |
| b4 | b3 | b2 | b1 | 0 | 1 | 2 | 3 | 4 | 5 | 6 | 7 |
| 0 | 0 | 0 | 0 | NUL | TC7 (DLE) | SP | 0 | @ | P | ` | p |
| 0 | 0 | 0 | 1 | TC1 (SOH) | DC1 | ! | 1 | A | Q | a | q |
| 0 | 0 | 1 | 0 | TC2 (STX) | DC2 | " | 2 | B | R | b | r |
| 0 | 0 | 1 | 1 | TC3 (ETX) | DC3 | # | 3 | C | S | c | s |
| 0 | 1 | 0 | 0 | TC4 (EOT) | DC4 | $ | 4 | D | T | d | t |
| 0 | 1 | 0 | 1 | TC5 (ENQ) | TC8 (NAK) | % | 5 | E | U | e | u |
| 0 | 1 | 1 | 0 | TC6 (ACK) | TC9 (SYN) | & | 6 | F | V | f | v |

FIG. 3B

| | | 0 | 0 | 0 | 0 | 1 | 1 | 1 | 1 |
|---|---|---|---|---|---|---|---|---|---|
| | | 0 | 0 | 1 | 1 | 0 | 0 | 1 | 1 |
| | | 0 | 1 | 0 | 1 | 0 | 1 | 0 | 1 |
| | | 7 | 8 | 9 | A | B | C | D | E | F |
| 0 | 1 | 1 | 1 | 0 | BEL | FE0 (BS) | FE1 (HT) | FE2 (LF) | FE3 (VT) | FE4 (FF) | FE5 (CR) | SO | SI |
| 1 | 0 | 0 | 0 | 1 | TC10 (ETB) | CAN | EM | SUB | ESC | IS4 (FS) | IS3 (GS) | IS2 (RS) | IS1 (US) |
| 1 | 0 | 0 | 1 | ' | ( | ) | * | + | , | - | . | / |
| 1 | 0 | 1 | 0 | 7 | 8 | 9 | : | ; | < | = | > | ? |
| 1 | 0 | 1 | 1 | G | H | I | J | K | L | M | N | O |
| 1 | 1 | 0 | 0 | W | X | Y | Z | [ | \ | ] | ^ | _ |
| 1 | 1 | 0 | 1 | g | h | i | j | k | l | m | n | o |
| 1 | 1 | 1 | 1 | w | x | y | z | { | | | } | ~ | DEL |

PRINT PRESSURE RETRIVAL FROM ASCENDING ORDER TABLE

This application is a continuation of application Ser. No. 07/309,928 filed Feb. 13, 1989, which is a continuation of Ser. No. 07/170,700 filed Mar. 14, 1988, which is a continuation of Ser. No. 06/907,152 filed Sept. 15, 1986, which is a continuation of Ser. No. 06/647,153, filed Sept. 4, 1984, all now abandoned.

BACKGROUND OF THE INVENTION

1. Field of the Invention

The present invention relates to a printer capable of producing a plurality of print pressures.

2. Description of the Prior Art

In a prior art printer such as an electronic inpact printer, a plurality of print pressures preset for each of the characters are generated by using print pressure memory means such as a ROM (read-only memory). In the print pressure memory means, character codes are arranged in a table in a predetermined sequence and corresponding print pressure data is stored.

Accordingly, it has been difficult in the prior art printer of this type to check the print pressure in a product test stage. The print pressure is usually adjusted by adjusting an excitation time of a hammer coil, and the excitation time can be checked by observing a coil drive waveform on an oscilloscope to measure the rise time of the waveform. Since the print pressures are read out randomly in the print pressure memory means of a prior art printer, print pressure check work is complex. Further, since the display time of the waveform is allotted to only one step, the display time is short and the waveform cannot be measured sufficiently.

SUMMARY OF THE INVENTION

It is an object of the present invention to provide a printer which determines print pressures by memory means which stores information on a plurality of characters in a sequence of print pressures.

It is other object of the present invention to provide a printer which produces information on a plurality of characters in a sequence of print pressures and prints the plurality of characters based on the above information.

Other objects of the present invention will be readily understood from the following description of preferred embodiments taken in conjunction with the accompanying drawings.

DETAILED DESCRIPTION OF THE PREFERRED EMBODIMENTS

Figure 1:
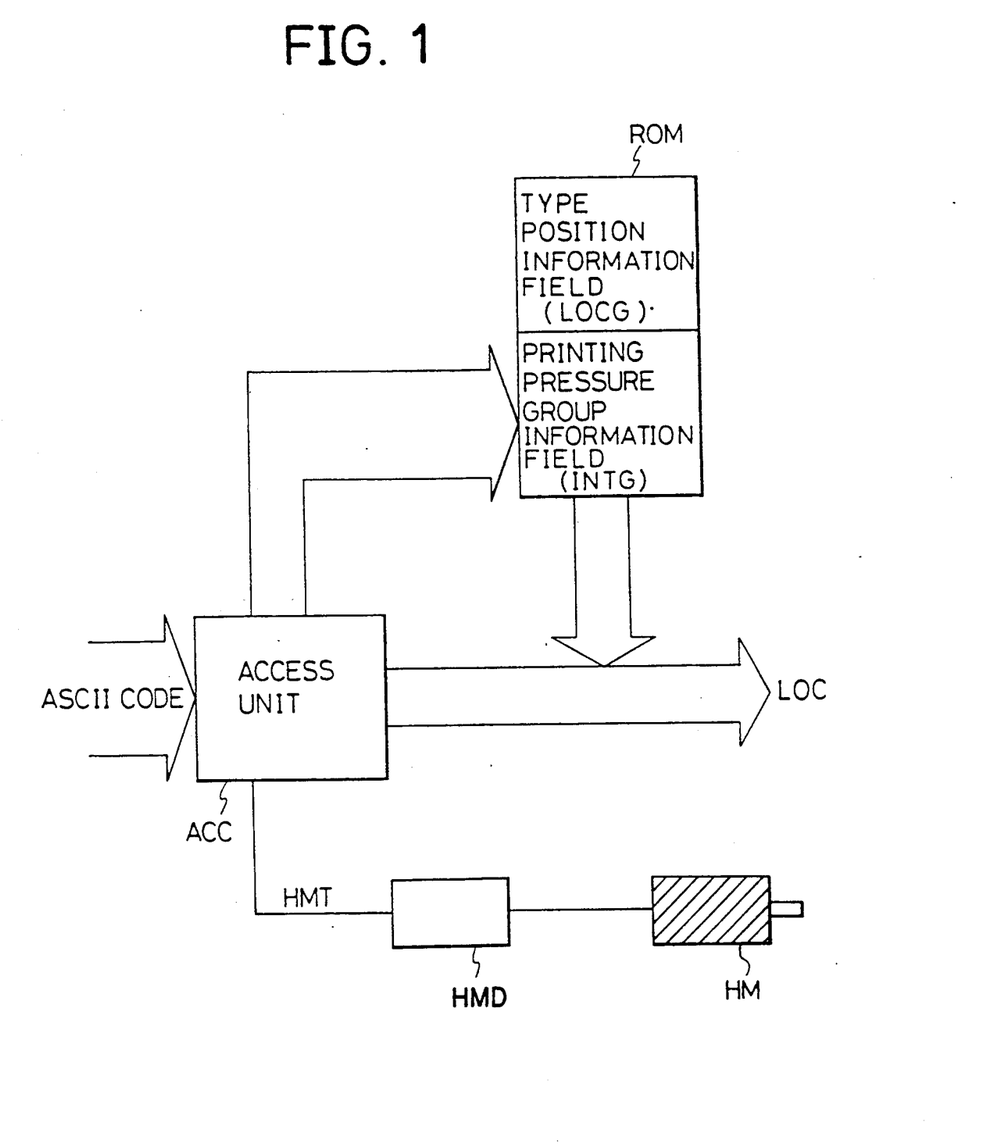
FIG. 1 is a block diagram of a schematic configuration of a printer of the present invention.

FIG. 1 shows a schematic configuration of a printer of the present invention. ROM denotes a read-only memory that comprises memory means and includes a type position information field LOCG and a print pressure group information field INTG. The type position information LOC stored in the type position information field LOCG is read out by supplying an ASCII code as is done in the prior art but the print pressure information stored in the print pressure group information unit INTG is output as a print hammer drive signal HMT through processing to be described later.

ACC denotes an access unit for accessing the memory ROM. When an ASCII code is applied to the access unit ACC as character information, it accesses the memory ROM to read out the type position information LOC and the print hammer drive signal HMT. HMD denotes a hammer driver activated by the print hammer drive signal HMT, and HM denotes a print hammer driven by the hammer driver HMD.

Figure 2:
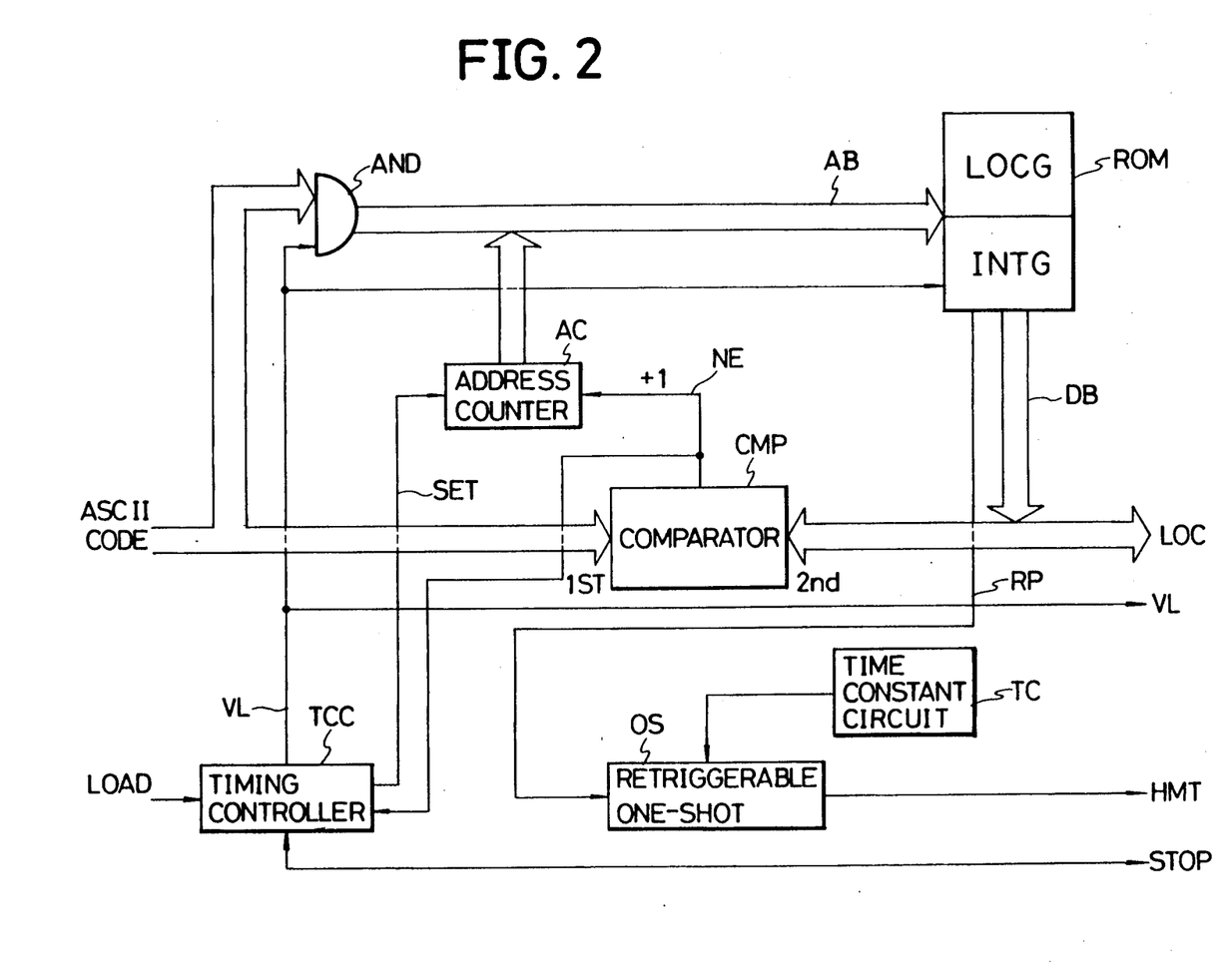
FIG. 2 is a block diagram of a circuit configuration of an access unit ACC of FIG. 1, FIG. 3 composed of FIGS. 3A and 3B show an ASCII code table.

FIG. 2 shows a circuit configuration of the access unit ACC of FIG. 1. CMP denotes a comparator which compares the ASCII code applied to the access unit ACC (see FIG. 3) with the ASCII code sequentially read from the print pressure group information field INTG of the memory ROM and produces an unequal signal NE when they are unequal. AC denotes an address counter which generates a readout address of the memory ROM, TCC denotes a timing controller, OS denotes a retriggerable one-shot which generates the print hammer drive signal HMT for a predetermined time in response to a retriggerable pulse sent from the print pressure group information field INTG together with the ASCII code, TC denotes a time constant circuit for the retriggerable one-shot, and AND denotes an AND gate which receives the input ASCII code and the signal from the timing controller TCC and supplies an output thereof to the memory ROM through an address bus AB.

Assuming that a character "M" is to be printed, an ASCII code "4D" $_{HEX}$ (see FIG. 3) representing the character "M" is supplied and an access unit triggering pulse is applied to an input terminal LOAD of the timing controller TCC. Thus, the timing controller TCC activates a signal line VL in response to the pulse. Since the signal line VL is connected to an address terminal of the memory ROM to select the type position information field LOCG of the memory ROM, the type position information LOC of the character "M" is sent from the memory ROM to the data bus DB of the ASCII code supplied from the AND gate and a signal indicating the setting of the type position information is output from the access unit ACC through the signal line VL.

When a type wheel drive circuit (not shown) receives the type position signal LOC and the above signal, it rotates a type wheel which can be a conventional, type member (not shown) to the print position of the character "M" indicated by the type position information LOC and stops it there.

When a signal indicating the stop of the type wheel which is generated simultaneously with the stop of the type wheel is applied to a terminal STOP of the timing controller TCC from the drive circuit, the timing controller TCC deactivates the signal line VL. Thereafter, the timing controller TCC starts to retrieve the print pressure group information field INTG of the memory ROM through the address counter AC in accordance with a procedure to be described later, supplies the retriggerable pulse to the retriggerable one-shot OS in response to the print pressure information of the characters read out from the information field INTG in the sequence of print pressure, and outputs the print hammer drive signal HMT from the retriggerable one-shot OS until a preset print pressure for the character "M" is reached, that is, until the both ASCII codes applied to the comparator CMP match.

The print hammer drive signal HMT is supplied to the hammer driver HMD and the print hammer HM is driven by the hammer drive HMD so that the character "M" is printed with the print pressure set for the character "M".

Figure 3A:
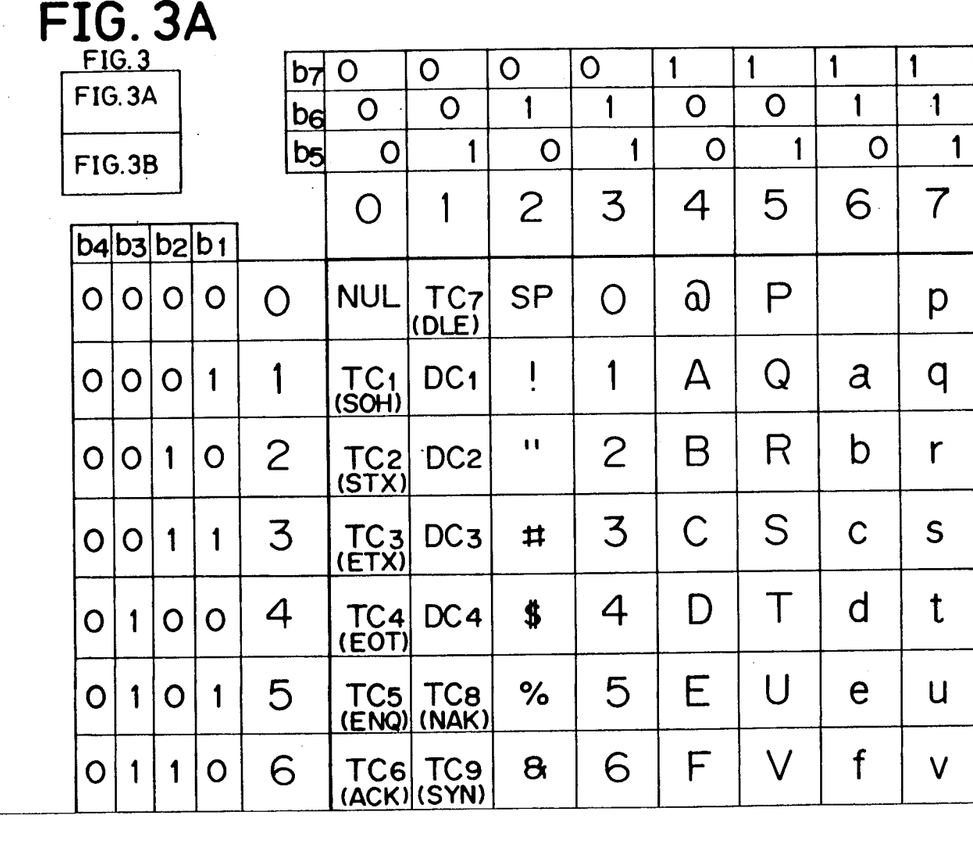
Figure 3B:
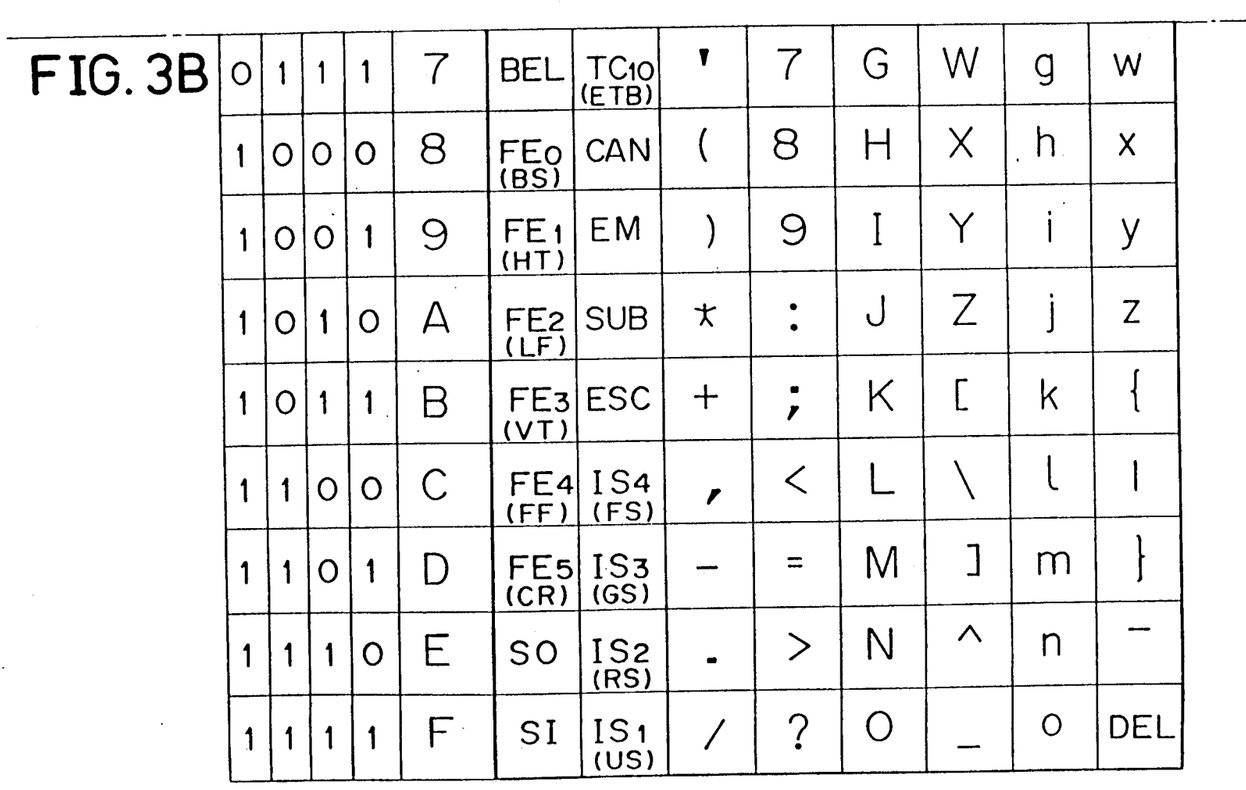
Figure 4:
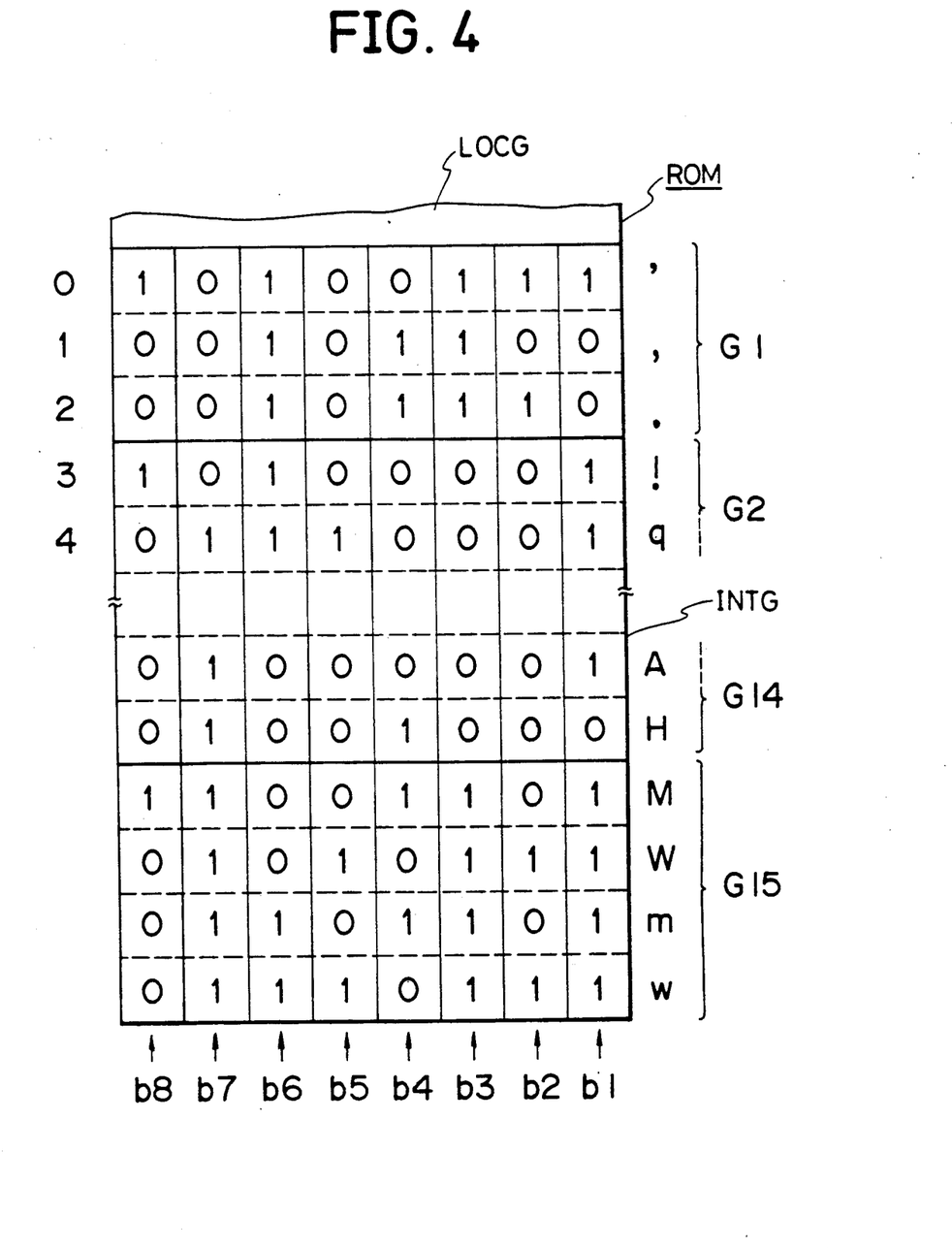
FIG. 4 shows print pressure group information field INTG shown in FIGS. 1 and 2.

FIG. 4 shows a configuration of the print pressure group information field INTG of the memory ROM shown in FIGS. 1 and 2. Symbols b1–b7 denote areas for storing the ASCII codes shown in FIGS. 3A and 3B in a hexadecimal form and b8 denotes an area for storing print pressure information for supplying the retriggering pulse. Each of those areas has a one-bit size.

The print pressure group information unit INTG stores print information other than the print pressure information, such as character information (ASCII code in the present embodiment), grouped for each print pressure. Apostrophe " ' ", comma ",", and period "." must be printed with a minimum print pressure and hence they are stored in a first group G1. Characters "M", "W", "m" and "w" need a maximum print pressure and hence they are stored in a last group G15. The print information other than the print pressure information are stored at bit positions 1–7 (b1–b7) by "1's" and "0's". The bit "1" indicating the supply of the retriggering pulse is stored at the eighth bit position (b8) of the first character of each of the groups G1–G15.

The information stored in the print pressure group information field INTG are sequentially read starting from the first character of the first group G1 by the readout address of the address counter AC. The eighth bit (b8) which is the retriggering pulse is supplied to the retriggerable one-shot OS through a signal line RP and the ASCII codes at the bits 1–7 are supplied to the second input terminal of the comparator CMP through the data bus DB. Accordingly, each time the leading position of each of the groups G1–G15 is retrieved, the retriggering pulse is supplied to the retriggerable one-shot OS. When the same character information as that applied to the access unit ACC is read out from the print pressure group information field INTG, the comparator CMP deactivates the unequal signal NE and stops a further retrieval through the timing controller TCC. Accordingly, as the group containing the character to be printed approaches the last group G15, more retriggering pulses are generated and the print pressure is increased.

Figure 5:
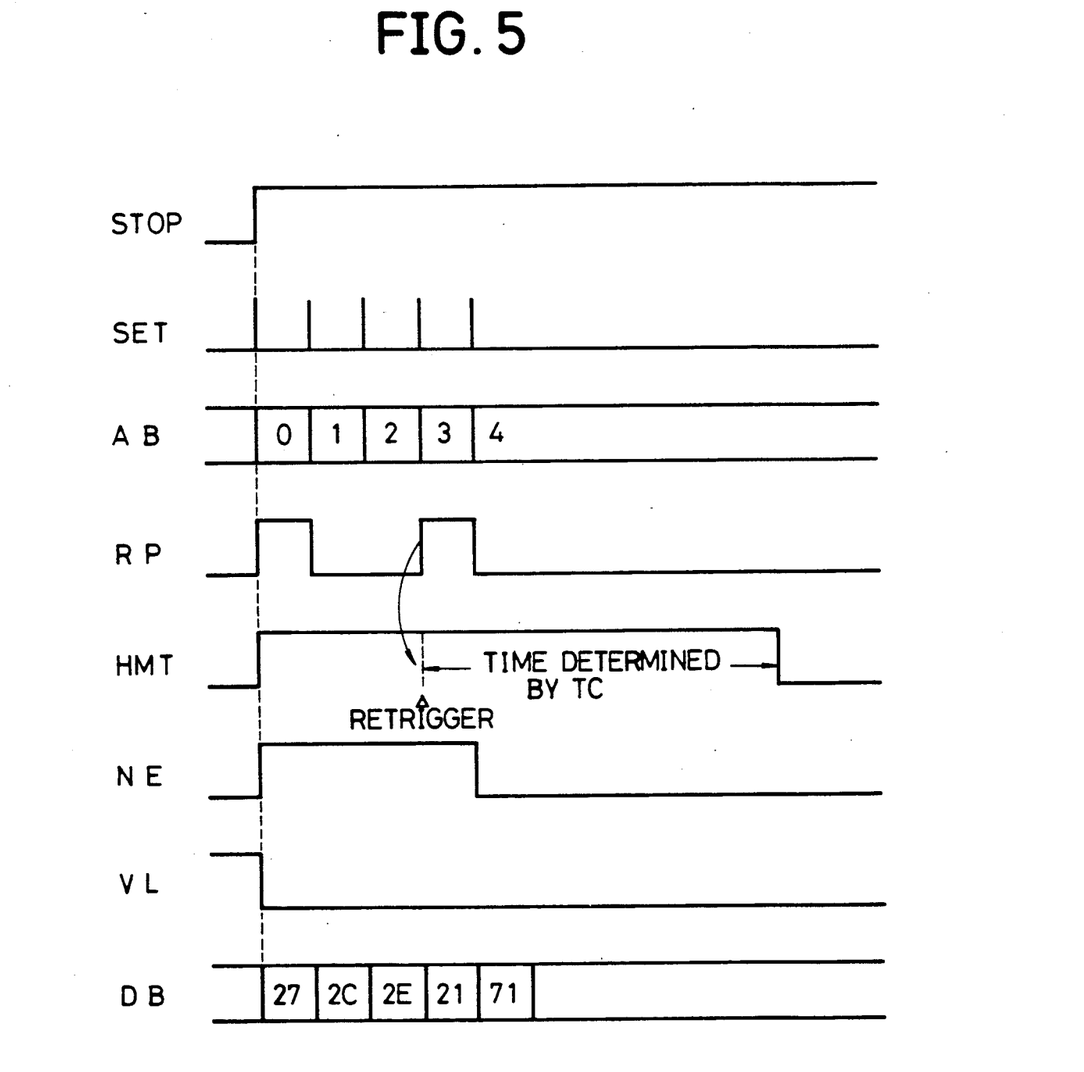
FIG. 5 is a timing chart showing an operation of the unit of FIG. 2.

Referring to a timing chart of FIG. 5, the operation of the present invention shown in FIGS. 1, 2 and 4 is explained in further detail.

Assume that a character "q" is to be printed. When a signal indicating that the type wheel has been stopped at the position to print the character "q" is applied to the terminal STOP, the timing controller TCC changes the signal line VL from logical "1" to logical "0" to allow the access of the memory content from the print pressure group information field INTG. Thereafter, the timing controller TCC sets the head address of the print pressure group information field INTG in the address counter AC through a signal line SET. As a result, the ASCII code "27" $_{HEX}$ (see FIG. 4) of the head character of the first group G1 appears on the data bus DB so that the second input to the comparator CMP is defined. Since the ASCII code "71" $_{HEX}$ (see FIG. 3A) which represents the character "q" has already been applied to the first input of the comparator CMP, the comparator CMP produces the unequal signal NE indicating the mismatch of the inputs. The signal read from the bit 8 (b8) of the print pressure group information field INTG appears on the signal line RP as the retriggering signal and it first triggers the retriggerable one-shot OS.

On the other hand, the timing controller TCC supplies the clock pulse in a self-running fashion to the address counter AC through the signal line SET, but since the unequal signal NE is at logical "1", the output of the address counter AC is incremented by one in response to the clock pulse. As a result, the ASCII code "2C" $_{HEX}$ (see FIG. 4) representing the second character "," in the first group G1 appears on the data bus DB but the output of the unequal signal NE of the comparator CMP remains.

The above sequence is repeated so that the ASCII code "2E" $_{HEX}$ representing the character "." and then the ASCII code "21" $_{HEX}$ representing the character "!" appear on the data bus DB (see FIGS. 3A and 4). When the data "21" $_{HEX}$ appears on the data bus DB, the signal at the bit 8 (b8) again appears on the signal line RP to retrigger the retriggerable one-shot OS.

When the ASCII code "71" $_{HEX}$ representing the character "q" then appears on the data bus DB, the comparator CMP deactivates the unequal signal NE, as a result, the set signal which is sent from the timing controller TCC to the address counter AC through the signal line SET is deactivated. Thus, the print sequence for the character "q" is terminated.

When the character "M" is to be printed, the above sequence is repeated until the ASCII code "4D" $_{HEX}$ (see FIG. 3B) representing the character "M" appears on the data bus DB. Since the character "M" belongs to the last group G15 as shown in FIG. 4, the retriggerable one-shot OS is retriggered 15 times to assure the optimum hammer drive time to print the character "M" for the hammer drive signal HMT.

In the present embodiment, since the print pressure is controlled by using the memory means INTG grouped by characters, the print pressure can be controlled without providing hardware for the respective print pressures.

Figure 6:
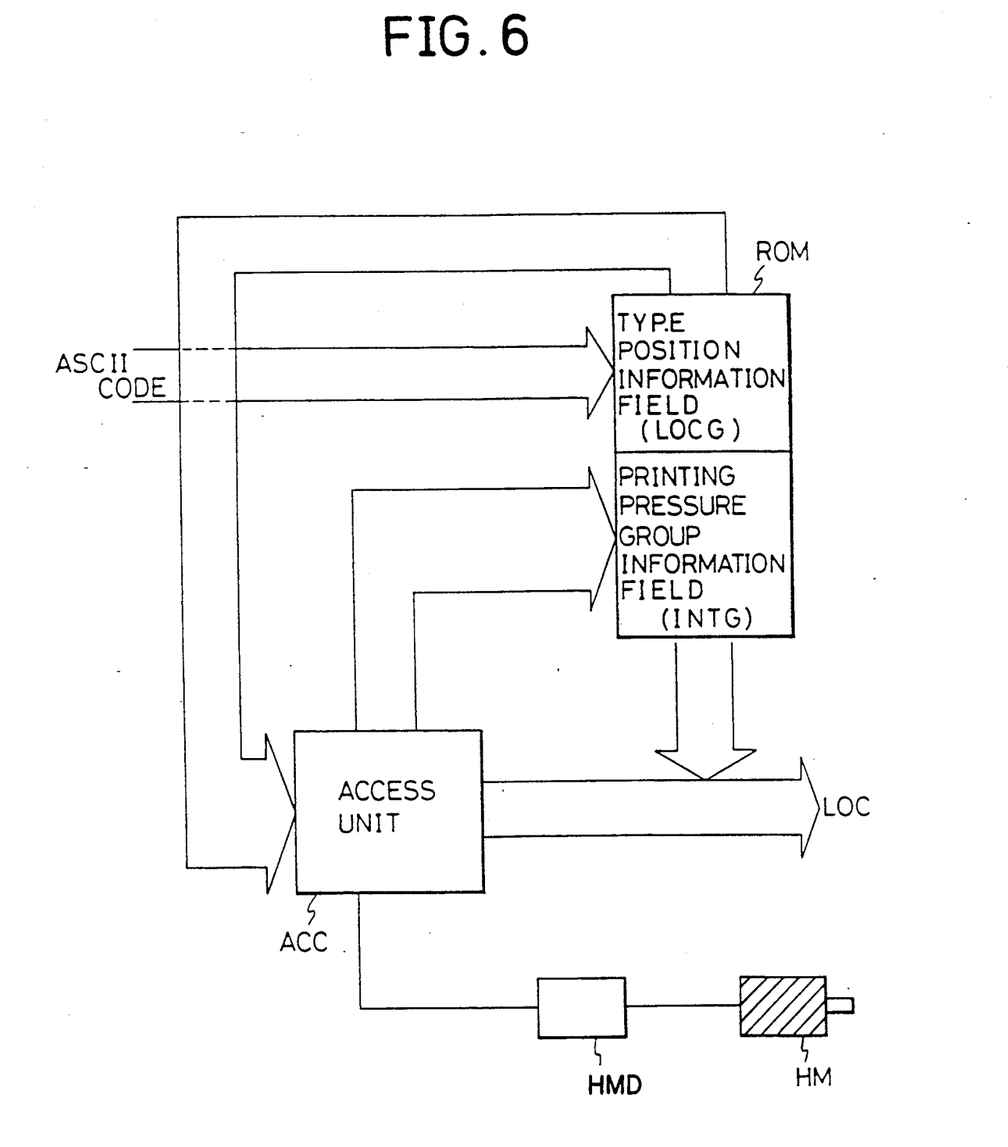
FIG. 6 is a block diagram of another configuration of the printer of the present invention.
Figure 7:
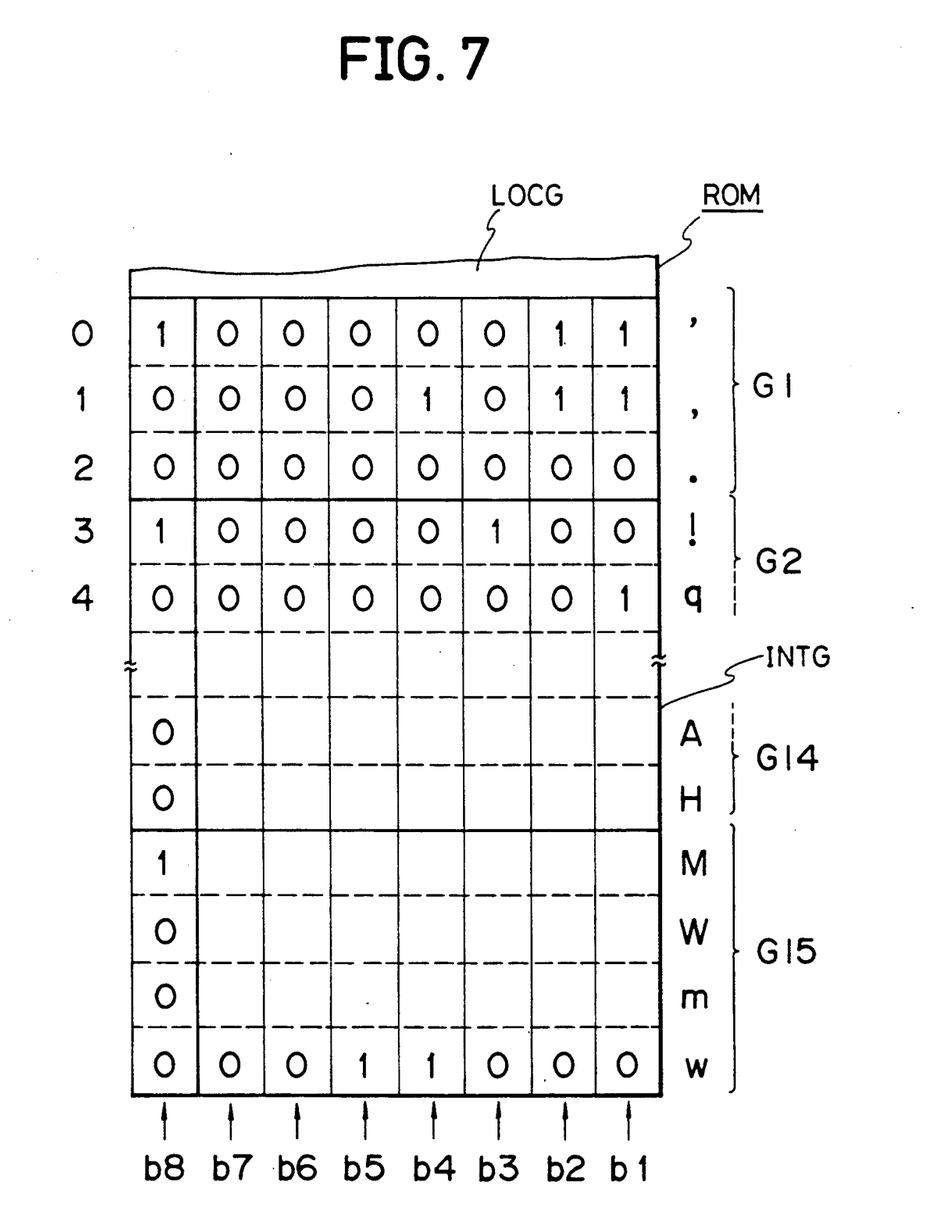
FIG. 7 shows a print pressure group information field INTG of FIG. 6.

In the above embodiment, the print pressure is controlled by comparing the ASCII codes. Alternatively, as shown in FIG. 6, the type position information LOC may be obtained from the type position information field LOCG by the input ASCII code and the print pressure group information field INTG may be accessed by the type position information LOC. As shown in FIG. 7, the type position information for the respective characters are stored in the print pressure group information field INTG for each of the print pressure groups G1–G15, and the type position information is sent to the data bus DB to supply it to one input of the comparator CMP (see FIG. 2), and the type position information read from the type position information field LOCG is applied to the other input of the comparator CMP so that the print pressure is controlled by the type position information. In FIG. 7, b8 is the data area for indicating the generation of the retriggering signal and b7-b1 are data areas in which the type position information is stored.

The present invention can also be applied to a microprocessor-controlled printer used in a word processor. In this case, the timing controller TCC is implemented by an equivalent program sequence, the address counter AC is implemented by internal registers of a microprocessor, the comparator CMP is implemented by a compare instruction and the retriggerable one-shot OS is implemented by a software timer loop so that the print pressure of the print hammer can be controlled by a single flip-flop.

As explained hereinabove, in accordance with the present invention, the print pressure is controlled by the memory means which stores the print information grouped by the print pressures. Accordingly, the construction of the access unit is simplified and the hardware thereof is significantly reduced. Even if the print pressure groups are sub-grouped, no additional hardware is required. Since the print information is sequentially output for each print pressure, the print pressures can be readily checked in the initial test and adjustment stage of the printer or in maintenance work by observing waveforms through an oscilloscope.

Figure 8:
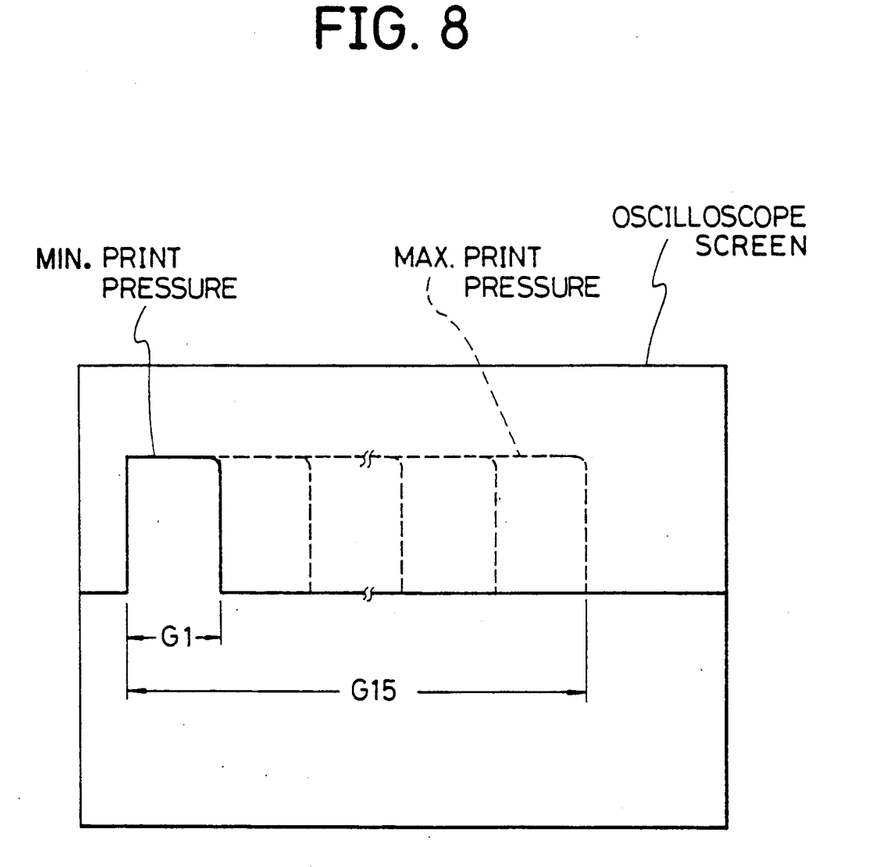
FIG. 8 is a diagram showing an example of display on an oscilloscope in a print pressure test stage.

In addition, in accordance with the present invention, the width of the pulse applied to the test and adjustment stage is varied in accordance with the print pressure as shown in FIG. 8 and a relation between the character and the print pressure can be automatically checked at a predetermined time in association with the duration of the pulse. Accordingly, automatic testing is facilitated.

What we claim is:

1. A printer comprising:
   input means for entering a character code to be printed;
   first table memory means responsive to said input means for producing type position information;
   second table memory means having a character code arranged according to required print pressure in ascending order;
   addressing means connected to said second table memory means for providing an address in sequential order from a specific address;
   comparing means for comparing a first character code entered by said input means with a second character code produced in response to said addressing means and for generating a signal when said first character code and said second character code are unequal; and
   control means for controlling a print hammer in response to said signal from said comparing means.

2. A printer according to claim 1, wherein said control means comprises means for driving said hammer while said signal is present.

3. A printer according to claim 1, further comprising means connected to said addressing means for providing a predetermined clock pulse for an address count.

4. A printer comprising:
   input means for entering a character code to be printed;
   table memory means having a character code arranged according to required print pressure in ascending order;
   addressing means connected to said table memory means for providing an address in sequential order from a specific address;
   comparing means for comparing a character code entered by said input means with a character code produced in response to said addressing means and for generating a signal when said character codes are unequal; and
   control means for controlling a print hammer in response to said signal from said comparing means.

5. A printer according to claim 4, wherein said control means comprises means for driving said print hammer while said signal from said comparing means is present.

6. A printer according to claim 4, further comprising means connected to said addressing means for providing a predetermined clock pulse for an address count.

7. A printer comprising;
   input means for entering a character code to be printed;
   first table memory means responsive to said input means for producing type position information;
   second table memory means having a character code and type position information corresponding to said character code arranged according to required print pressure in ascending order;
   addressing means connected to said second table memory means for providing an address in sequential order from a specific address;
   comparing means for comparing type position information produced by said first table memory means with type position information produced in response to said addressing means and for generating a signal when said type position information produced by said first table memory means and said type position information produced in response to said addressing means are unequal; and
   control means for controlling a print hammer in response to said signal from said comparing means.

8. A printer according to claim 7, wherein said control means comprises means for driving said print hammer while said signal from said comparing means is present.

9. A printer according to claim 7, further comprising means connected to said addressing means for providing a predetermined clock pulse for an address count.

* * * * *

UNITED STATES PATENT AND TRADEMARK OFFICE
CERTIFICATE OF CORRECTION

PATENT NO. : 5,092,692
DATED : March 3, 1992
INVENTOR(S) : Hiroyuki Ueda, et al.

It is certified that error appears in the above-identified patent and that said Letters Patent is hereby corrected as shown below:

On the title page, Item [54]:

Line 1, "RETRIVAL" should read --RETRIEVAL--.

COLUMN 1:

Line 1, "RETRIVAL" should read --RETRIEVAL--.

COLUMN 2:

Line 43, "FIG. 3)" should read --FIG. 3B--.

COLUMN 6:

Line 27, "comprising;" should read --comprising:--

Signed and Sealed this

Twenty-ninth Day of June, 1993

Attest:

MICHAEL K. KIRK

Attesting Officer

Acting Commissioner of Patents and Trademarks